United States Patent
Zeng (10) Patent No.: US 6,636,661 B1
(45) Date of Patent: Oct. 21, 2003

(54) OPTICAL SIGNAL INTERLEAVING COMB FILTER WITH REDUCED CHROMATIC DISPERSION AND APPLICATIONS THEREFOR

(75) Inventor: An Andrew Zeng, Milpitas, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 9 days.

(21) Appl. No.: 10/085,594

(22) Filed: Feb. 26, 2002

(51) Int. Cl.[7] .............................. G02B 6/28; H01L 15/00; H01S 3/10
(52) U.S. Cl. .............................. 385/24; 385/39; 385/27; 359/337; 359/332; 372/703
(58) Field of Search ................................ 385/24, 14, 27, 385/39, 122, 123; 359/332, 161, 173, 341.1, 341.2, 337.5, 337.2; 372/25, 703

(56) References Cited

U.S. PATENT DOCUMENTS

| | | | |
|---|---|---|---|
| 5,115,338 A | * 5/1992 | DiGiovanni et al. | 359/337 |
| 5,291,569 A | * 3/1994 | Goutzoulis et al. | 385/39 |
| 5,596,661 A | 1/1997 | Henry et al. | 385/24 |
| 5,647,032 A | * 7/1997 | Jutamulia | 385/145 |
| 5,778,015 A | * 7/1998 | Gunning et al. | 372/25 |
| 6,175,668 B1 | * 1/2001 | Borrelli et al. | 385/11 |
| 6,529,314 B1 | * 3/2003 | Shukunami et al. | 359/332 |

* cited by examiner

Primary Examiner—Phan T. H. Palmer
(74) Attorney, Agent, or Firm—Blakely, Sokoloff, Taylor & Zafman LLP (57) ABSTRACT

Optical signal interleaver/deinterleavers with reduced chromatic dispersion are described. In one embodiment, the interleaver/deinterleavers include two optical filters and an optical isolator coupled to receive the output of each of the optical filters. The optical isolators feed the filtered signals back to the filters. Passing the filtered signals back through the filters in the opposite direction as the first pass allows the filters to cancel, or nearly cancel, the chromatic dispersion caused by the filters on the first pass. Thus, the interleaver/deinterleavers provide reduced chromatic dispersion as compared to use of a single filter or of cascaded filters.

20 Claims, 7 Drawing Sheets

OPTICAL SIGNAL INTERLEAVING COMB FILTER WITH REDUCED CHROMATIC DISPERSION AND APPLICATIONS THEREFOR

FIELD

The invention relates to optical devices. More particularly, the invention relates to an interleaving comb filter that can be used, for example as an interleaver and/or a deinterleaver having a feedback loop to reduce chromatic dispersion.

BACKGROUND

Development of future optical fiber communications system can be characterized by three trends: higher speed, better spectrum efficiency (i.e., closer channel spacing) and longer transmission reach. To achieve these goals, passive dense wavelength division multiplexing (DWDM) have been developed, which multiplex signals on a single optical fiber using different frequencies, or channels. In DWDM system components, it is generally desirable to have the following characteristics: low dispersion, small channel spacing, wide flat-top passband, low; insertion loss and high isolation.

DWDM systems use multiplexers and demultiplexers to operate on optical signals having multiple channels. Interleaving and deinterleaving of optical channels allows a subset of channels to be filtered from or added to another set of channels. Interleavers and deinterleavers are typically manufactured using various combinations of crystals and/or other components. The closer the channels become in terms of frequency, the more important the effects of chromatic dispersion become. Chromatic dispersion is wavelength dependent speed of propagation and causes a signal to spread or disperse.

Chromatic dispersion in an optical device normally has two origins: material dispersion and structural dispersion. In most interleaver/deinterleavers in the prior art, chromatic dispersion is dominated by structural dispersion because the length of the material (e.g., fiber, glass, crystal) used to construct the interleaver/deinterleaver is relatively short. Thus, the structure of the interleaver/deinterleaver can increase or decrease the chromatic dispersion based on the design used.

Traditional techniques for reducing chromatic dispersion include matching components having equal and opposite dispersion characteristics such that the dispersion from one component cancels the dispersion from another component. Such matching techniques are complex and difficult, which results in an increased cost and complexity of the optical device. Moreover, these techniques may not provide sufficient reduction of chromatic dispersion for channels having a spacing of 25 GHz or less.

SUMMARY

Optical filters and optical interleaver/deinterleavers are described. In one embodiment, the optical filter includes two optical fibers, each having a first end and a second end. The first and the second fibers are fused together in multiple places having, each of the fused sections having coupling ratios such that an optical signal having multiple frequencies input to the first end of the first fiber is filtered into a first filtered signal including a first subset of the multiple frequencies at the second end of the first fiber and a second signal including a second subset of the multiple frequencies at the second end of the second fiber, the first signal having a chromatic dispersion caused by passing the first signal from the first end of the first fiber to the second end of the first fiber. A non-reciprocal optical element, for example, an optical isolator, is coupled between the second end of the first fiber and the second end of the second fiber, the non-reciprocal optical element passes the first signal from the second end of the first fiber to the second end of the second fiber. The passing of the first signal to the first end of the second fiber reduces the chromatic dispersion caused by passing the first signal from the first end of the first fiber to the second end of the first fiber.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Optical signal filters that can be used, for example, to provide an optical interleaver and/or deinterleaver with reduced chromatic dispersion are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Optical signal filters with reduced chromatic dispersion are described. The filters are designed such that during a first pass through the filter an optical signal is filtered according to a predetermined filtering characteristic (e.g., a comb filter, a high pass filter). The first pass through the filter causes a certain amount of chromatic dispersion in the optical signal. Passing the filtered signals back through the filters in the opposite direction as the first pass allows the filters to cancel, or nearly cancel, the chromatic dispersion caused by the filters on the first pass.

In one embodiment, the interleaver/deinterleavers include two optical filters and an optical isolator coupled to receive the output of each of the optical filters. The interleaver/ deinterleavers provide reduced chromatic dispersion as compared to use of a single filter or of cascaded filters. In one embodiment, the direction in which optical signals pass through the isolators determines whether the filter,output is even channels or odd channels.

Figure 1:
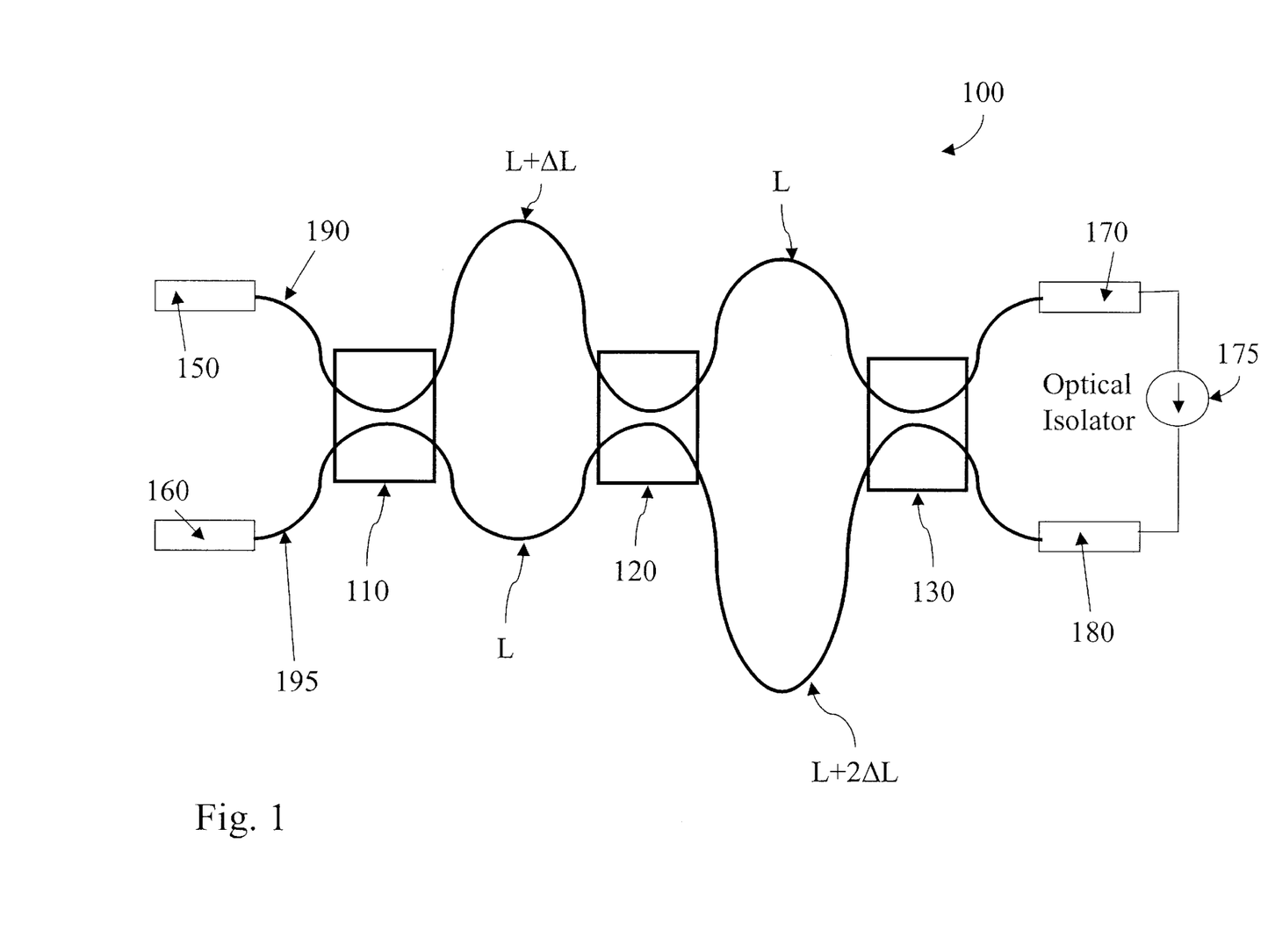
FIG. 1 illustrates one embodiment of an optical filter.

FIG. 1 illustrates one embodiment of an optical filter. Optical filter 100 can be an even channel comb filter, an odd channel comb filter, or any type of comb filter. As described in greater detail below, the ports through which optical signals are transmitted can determine the filtering characteristic applied to the signals.

In one embodiment, filter 100 includes fibers 190 and 195 that are fused three times. Fused sections 110, 120 and 130 form a two-stage modified Mach-Zehnder interferometer (MZI). In general, a MZI is an interferometric device that makes use of two interfering paths of different lengths to resolve different wavelengths. In one embodiment, the length (L+ΔL) of fiber 190 between fused section 110 and fused section 120 is greater than the length (L) of fiber 195 between fused section 110 and fused section 120. In one embodiment, ΔL determines channel spacing. For 50 GHz channel spacing, ΔL is about 2 mm; however, other values for ΔL can be used, for example, to provide other filtering characteristics/channel spacings.

The length ΔL represents the path length difference between the two "arms" of the modified MZI of FIG. 1. The path length difference in the arms allows the modified MZI to be tuned to provide the desired filtering characteristic of the first stage of the modified MZI. The second stage of the modified MZI includes fused portions 120 and 130 and the sections of fibers 190 and 195 between fused portions 120 and 130. The length of fiber 190 between fused portions 120 and 130 is L. The length of fiber 195 between fused portions 120 and 130 is L+2ΔL.

In one embodiment, the coupling ratio of fused section 110 is 50/50. Thus, 50% of the incoming signal strength is directed to fiber 190 and 50% of the incoming signal strength is directed to fiber 195. In one embodiment, fused portion 120 is a 27/73 coupler. In other words, 27% of the incoming signal from fiber 195 (on the left of coupler 120) is directed to fiber 190 and 73% to fiber 195 (on the right of coupler 120). In the other direction, 73% of the incoming signal from fiber 190 (on the left of coupler 120) is directed to fiber 190 (on the right of coupler 120) and 27% to fiber 195 (on the right of coupler 120).

Fused portion 130 is a 12/88 coupler. In other words, 12% of the incoming signal from fiber 195 (on the left of coupler 130) is directed to fiber 190 and 88% to fiber 195 (on the right of coupler 130). In the opposite direction, 88% of the incoming signal from fiber 190 (on the left of coupler 130) is directed to fiber 190 (on the right of coupler 130) and 12% to fiber 195 (on the right of coupler 130). Other coupling ratios, such as 50/50, 31/69, and 8/92 can also be used.

Fused fibers can be formed by twisting two or more optical fibers around each other and heating the fibers while pulling the fibers so that the fibers along the heated portion taper and fuse together. The fusing and tapering process is performed on an optical fiber fusion machine which typically consists of a mechanism (mechanical or vacuum) to hold the fibers in place, a heat source to soften the, fibers, a mechanism to rotate the fibers about a central axis to create a twist in the fibers, and a mechanical stage to draw the fibers under tension while they are being heated. In a coupler of this type, light signals propagated along one fiber can be coupled to one or more of the other fibers. Fused fibers generally provide relatively low loss, good temperature stability, high power handling and mechanical rigidity.

In operation, if a signal having both even and odd channels is passed through port 150 the signal is filtered such that odd channels pass to port 170 and even channels pass to port 180. The signals emerging from ports 170 and 180 are filtered and have an associated chromatic dispersion caused by the pass through filter 100.

In order to reduce chromatic dispersion, optical isolator 175 is coupled between ports 170 and 180. Continuing the example from above, to provide an odd channel filter that causes reduced chromatic dispersion, optical isolator 175 is connected in such a way that it passes the odd channel signals from port 170 to port 180 and blocks ilk the even-channel signals from port 180 to port 170. The odd channel signals pass through filter 100 the second time, but in the opposite direction. The signal output from port 160 is the odd channels included in the signal that was input to port 150. The odd channels output from port 160 have reduced chromatic dispersion as compared to a single pass through filter 100.

Figure 4:
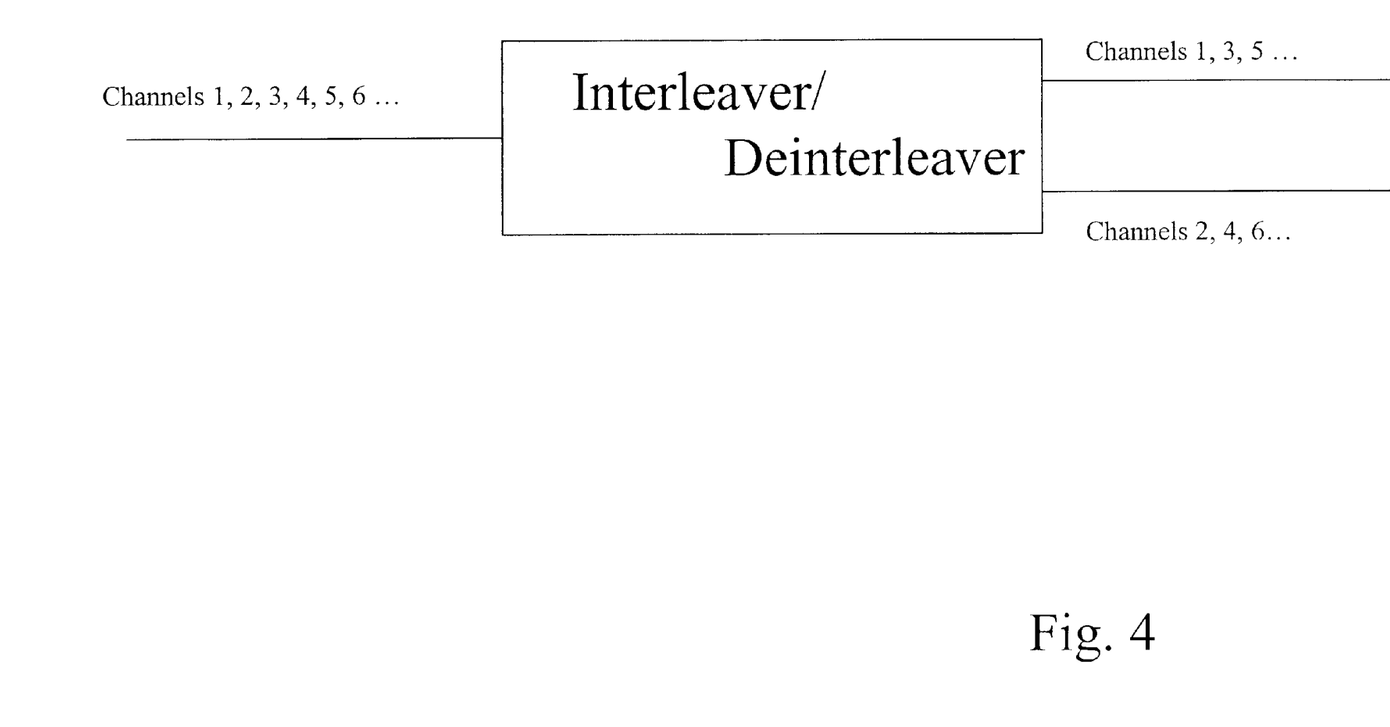
FIG. 4 is a conceptual illustration of a conversion between two channel spacings.

Filter 100 becomes an even channel filter when the input signal is via port 160 instead of 150. In this case, the even channels would be passed to port 170 and odd channels would be passed to port 180. Optical isolator 175 would pass the even channels from port 170 to port 180 and blocks the odd channels from port 180 to port 170. The even channel signals pass filter 100 the second time from port 180 to 150. As a result, the even channel signal at port 150 would have a reduced chromatic dispersion as compared to a single pass through filter 100 . It is important to emphasize that the filter illustrated in FIG. 1 is both an odd and an even comb filter. It functions as an odd comb filter for signals propagating from port 150 to 160 and an even comb filter for signals traveling in reverse direction from port 160 to 150. For this reason, the comb filter illustrated in FIG. 1 can be referred to as an "interleaving comb filter". The interleaving comb filter becomes a bi-directional interleaver when connected to an optical circulator as illustrated in FIG. 4. Note that the comb filter in FIG. 4 is illustrated as a two-port in-line device for reasons of simplicity of description.

Figure 2:
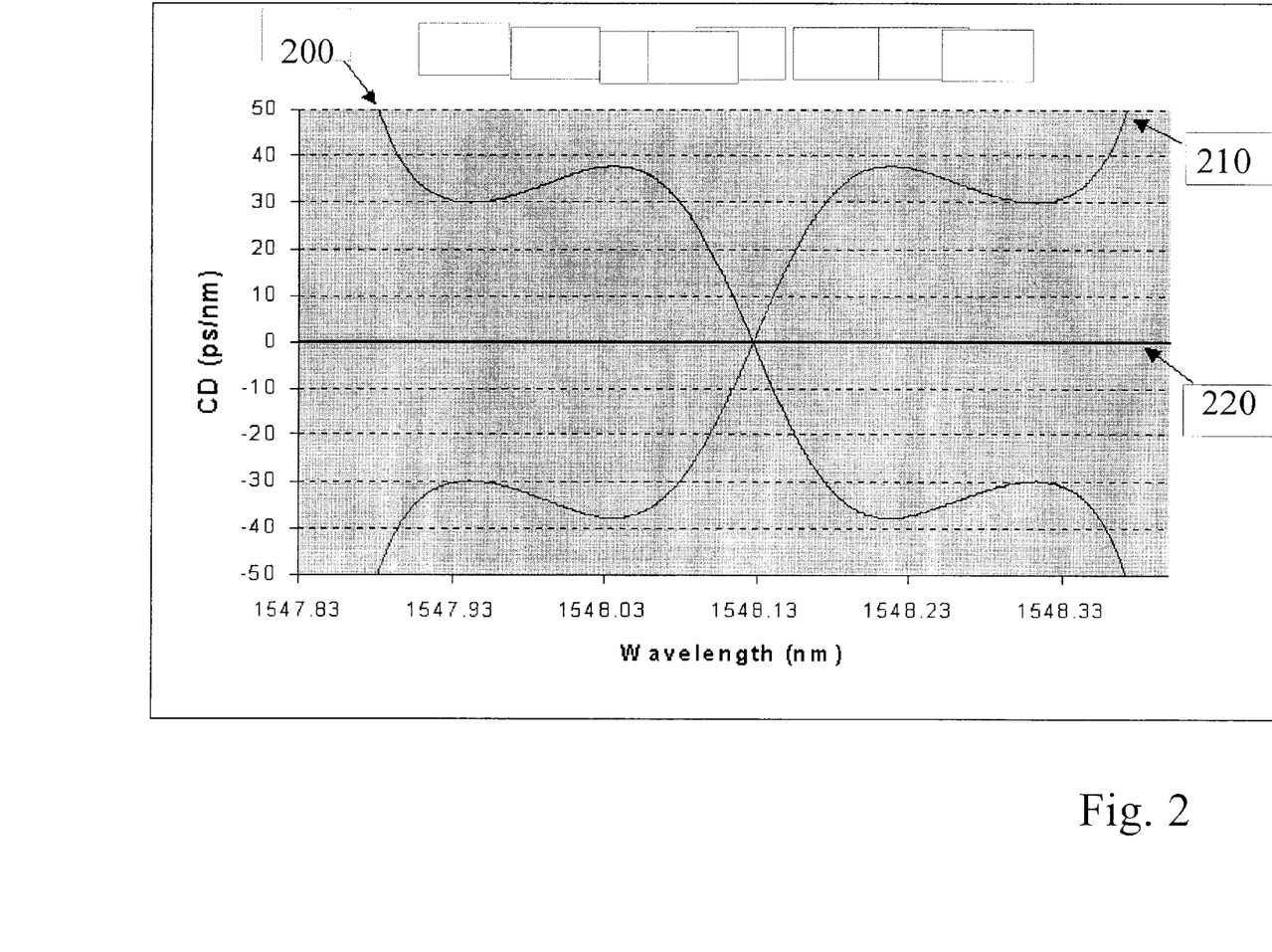
FIG. 2 illustrates the chromatic dispersion of first and second passes through one embodiment of an optical filter as illustrated in FIG. 1.

FIG. 2 illustrates the chromatic dispersion of the first and the second passes through one embodiment of an optical filter as illustrated in FIG. 1. Line 210 illustrates chromatic dispersion as caused by the first pass through an optical filter as illustrated in FIG. 1 from port 150 to 170 or from port 160 to 170. Line 200 illustrates chromatic dispersion as caused by the second pass through the optical filter from port 180 to 160 or from port 180 to 150. Line 220 illustrates the summation of lines 200 and 210. Thus, by using a filter as described herein and passing a signal through the filter twice as described the chromatic dispersion caused by the filtering can be reduced or even eliminated.

Figure 3:
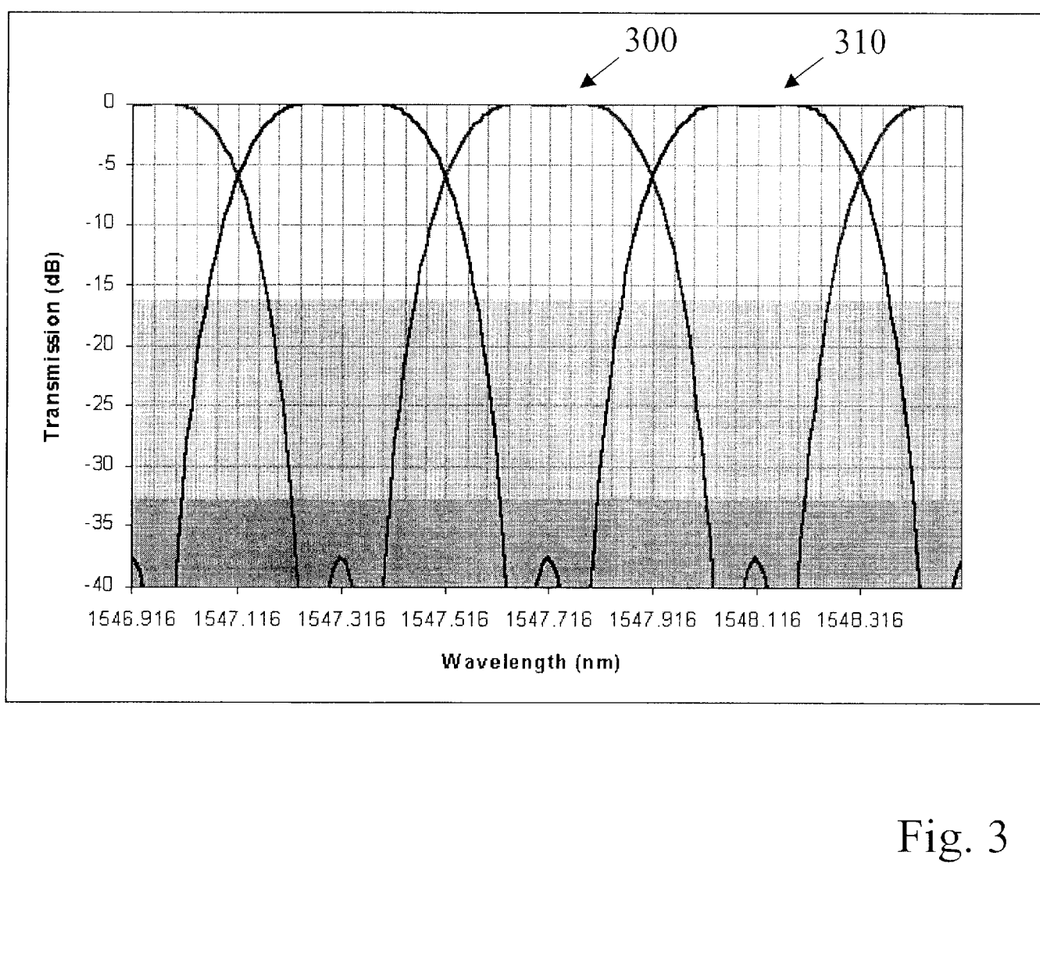
FIG. 3 illustrates passband characteristics of one embodiment of an optical filter as illustrated in FIG. 1.

FIG. 3 illustrates passband characteristics of one embodiment of an optical filter as illustrated in FIG. 1. Line 300 illustrates passbands for filter 100 to pass odd channels and line 310 illustrates passbands for filter 100 to pass even channels.

Figure 7:
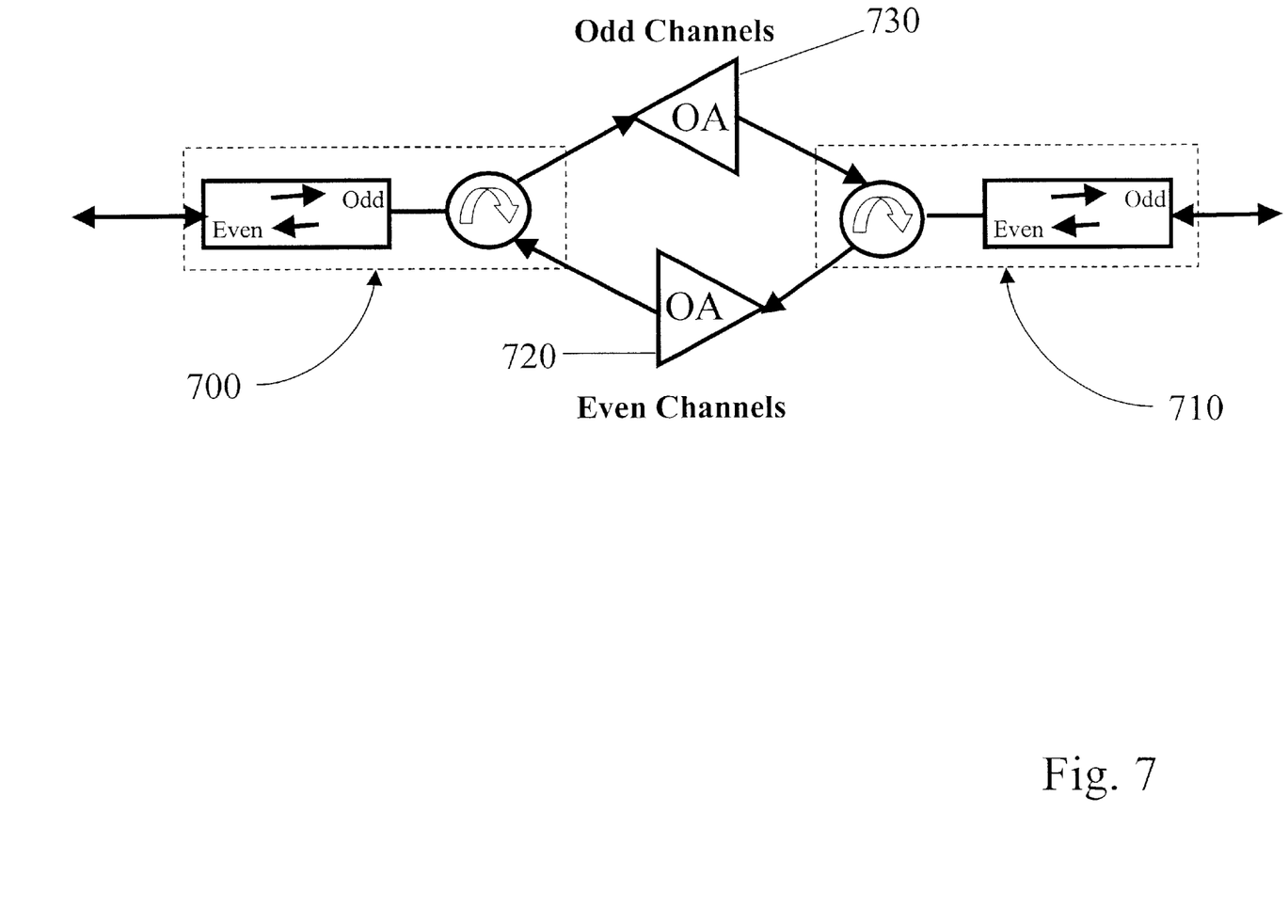
FIG. 7 illustrates one embodiment of an amplification node of a bi-directional optical system utilizing the bi-directional device of FIG. 6.

Unlike a conventional interleaver, the bi-directional interleaver described herein interleaves and deinterleavers two sets of signals traveling in opposite directions. This feature has important applications in a bi-directional fiber optical transport system, where one fiber is used for passing signals in both directions as compared to using two fibers (one for each direction) in a conventional fiber optical transport system. In a long-haul system, the signals need to be amplified every 60–80 km. Because most erbium-doped fiber amplifiers (EDFAs) include isolators, the amplification only works for signals traveling in one direction. In order to amplify bi-directional signals in one fiber, the signals of the two opposite directions are split into two fibers using a bi-directional interleaver at the amplification node as illustrated in FIG. 7.

Once separated into two fibers, the signals of the two directions are amplified separately using two EDFAs, one for each direction. After amplification, the signals are recombined into one fiber using a second bi-directional interleaver. The bi-directional interleaver is a key component at an amplification node in a bi directional system. In addition to splitting or combining signals of both directions, it has another important function in a bi-directional system noise suppression. The bi-directional interleaver blocks or reduces Raleigh back scattering caused by transmission fibers, a well-known detrimental effect unique to bi-directional system.

In a long-haul transport system, signals pass through many amplification nodes. It is imperative that the bi-directional interleaver at each amplification node has low chromatic dispersion so that the accumulated chromatic dispersion of the whole system is kept below a design budget. It should be pointed out that a conventional interleaver could also be used in place of the bi-directional interleaver. However, it is well know that conventional interleavers have relatively high chromatic dispersion. This is especially true for narrow channel spacing interleavers since chromatic dispersion is proportional to one over channel spacing squared for an uncompensated interleaver. The bi-directional interleaver illustrated in FIG. 6 has demonstrated extremely low chromatic dispersion, less than 4 ps/nm for a 25 GHz interleaver.

FIG. 4 is a conceptual illustration of an interleaver providing conversion between two channel spacings. The conversion of FIG. 4 is useful, for example, to allow devices designed to operate, for example, with an optical channel scheme having 100 GHz channel spacing to interact with other devices or a network designed to operate with an optical channel scheme having 50 GHz channel spacing. Conversion between 100 GHz channel spacing and 50 GHz channel spacing allows, for example, network bandwidth to be increased without upgrading all of the devices that interact with the network.

In one embodiment, the device of FIG. 4 is a deinterleaver that separates an optical signal having even and odd channels (e.g., ITU channels) into a first optical signal including the even channels and a second optical signal including the odd signals. After the signals are deinterleaved, the odd channels have a channel spacing that is double the channel spacing of the incoming signal. Similarly, the even channels also have a channel spacing that is double the channel spacing of the incoming signal.

Recombining the even and the odd channels can be accomplished with an interleaver that combines the odd channels and the even channels into a single optical signal. In other words, the even and odd channels having 100 GHz spacing are combined (interleaved) into an optical signal having 50 GHz signal spacing. Similar interleaving can be provided to convert between 50 GHz spaced channels and 25 GHz spaced channels, as well as between other sets of channel spacing schemes.

Figure 5:
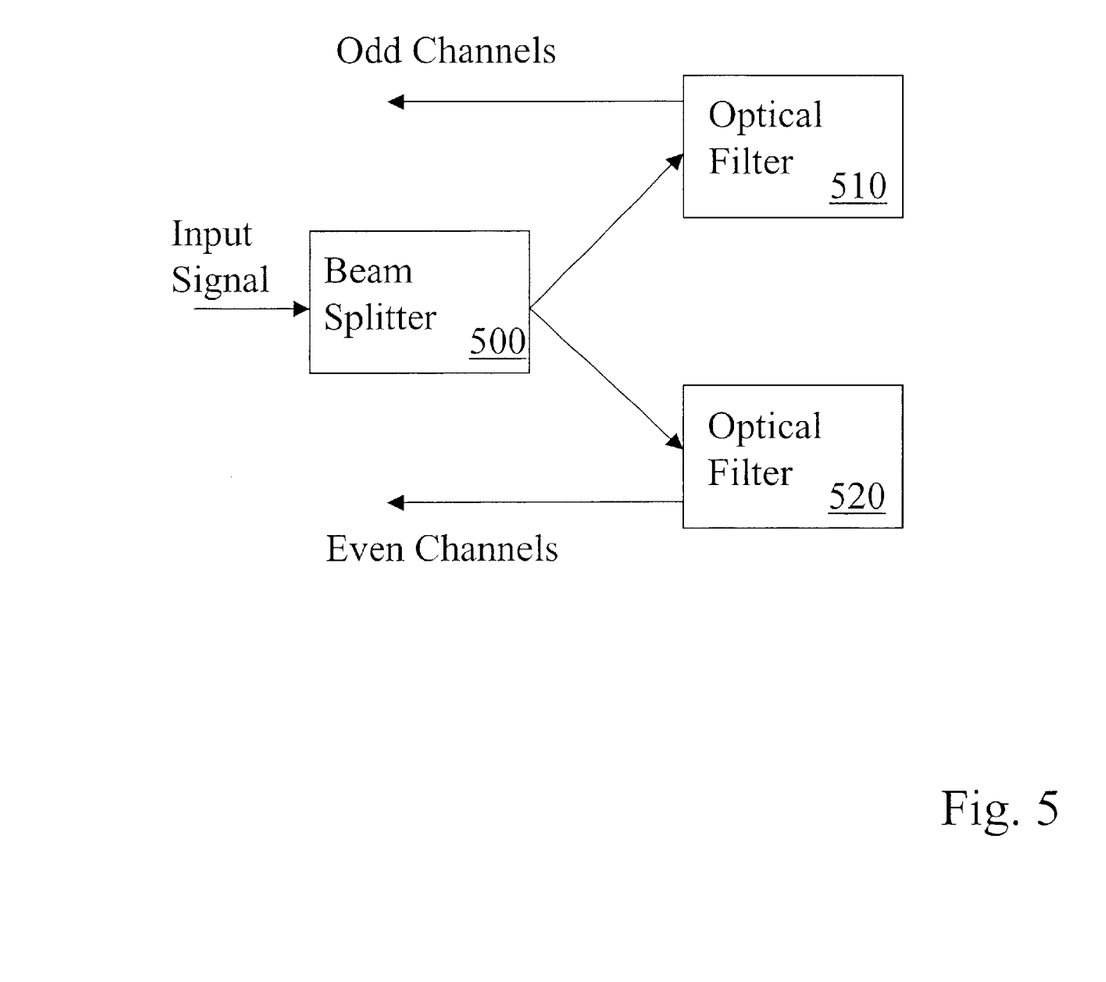
FIG. 5 is a block diagram of a uni-directional optical interleaver/deinterleaver having reduced chromatic dispersion.

FIG. 5 is a block diagram of a uni-directional optical interleaver/deinterleaver having reduced chromatic dispersion. The arrows of FIG. 5 illustrate the interleaver/deinterleaver as operating as a deinterleaver. That is, the arrows of FIG. 5 illustrate a single optical signal that includes a first subset of frequencies (e.g., ITU even channels) and a second subset of frequencies (e.g., ITU odd channels) being split into two signals corresponding to the first subset of frequencies and the second subset of frequencies. The interleaver/deinterleaver of FIG. 5 is uni-directional in the sense that odd and even channels do not travel in opposite directions contemporaneously through the interleaver/deinterleaver.

If signals were passed through the interleaver/deinterleaver in the opposite direction of the arrows of FIG. 5, the interleaver/deinterleaver would operate as an interleaver. That is, a first signal having a first set of frequencies (e.g., ITU even channels) and a second signal having a second set of frequencies (e.g., ITU odd channels) is combined into an interleaved signal including both the first set of frequencies and the second set of frequencies.

When operating as a deinterleaver, beam splitter 500 receives an input signal that can include data carried on various frequencies in any manner known in the art. For example, the input signal can be a dense wavelength division multiplexed (DWDM) signal that includes one or more odd channels as well as one or more even channels. Beam splitter 500 splits the input signal into two "sub-beams" that carry all of the frequencies of the input signal. In one embodiment, beam splitter 500 is a 3 dB coupler; however, other beam splitters can also be used. Beam splitter 500 is optically coupled with optical filter 510 and optical filter 520.

One sub-beam of the input signal is directed to optical filter 510 and the other sub-beam is directed to optical filter 520. Optical filters 510 and 520 perform filtering functions as the optical signals pass through the filters. In one embodiment, optical filter 510 is a comb filter that passes a first predetermined set of frequencies (e.g., odd channels, alternate odd channels (1, 5, 9, . . . )). Optical filter 520 is a comb filter that passes a second predetermined set of frequencies (e.g., even channels, alternate odd channels (3, 7, 11, . . . )). Other types of filtering characteristics can be provided by optical filters 510 and 520. In one embodiment, the filter described above with respect to FIG. 1 can be used for optical filter 510 and/or optical filter 520.

Figure 6:
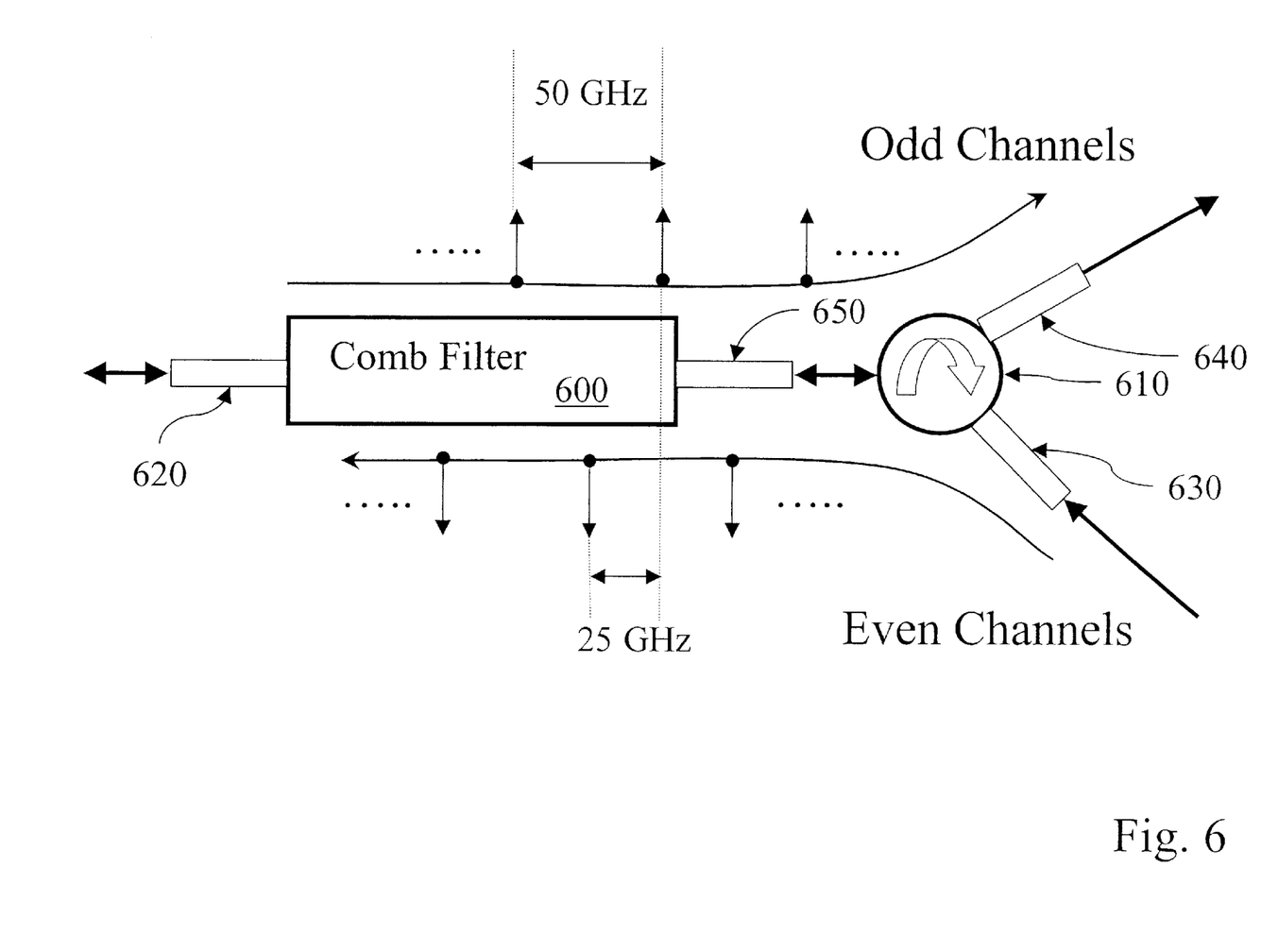
FIG. 6 illustrates one embodiment of a bi-directional optical interleaver/deinterleaver.

FIG. 6 illustrates one embodiment of a bi-directional optical interleaver/deinterleaver. The interleaver/deinterleaver of FIG. 6 includes an optical circulator that allows even and odd channels to pass in opposite directions contemporaneously. The example of FIG. 6 illustrates even channels with a 50 GHz channel spacing and odd channels with a 50 GHz channel spacing such that an interleaved signal with both even and odd channels has a 25 GHz channel spacing.

In general, an optical circulator is a passive, non-reciprocal optical device that can be found in many applications, for example, optical amplifiers, dispersion compensation devices, and bi-directional optical communications systems. Optical circulator 610 passes odd channels from port 650 of comb filter 600 to port 640. Optical circulator 610 also passes even channels from port 630 to port 650 of comb filter 600. Thus, the combination of comb filter 600 and optical circulator 610 provides a bi-directional optical device that allows a first set of frequencies to pass in a first direction and a second set of frequencies to pass in a second direction.

FIG. 7 illustrates one embodiment of an amplification node of a bi-directional optical system utilizing the interleaver/deinterleaver of FIG. 6. In general, the amplification node of FIG. 7 includes two interleaver/deinterleavers, such as the optical device of FIG. 6, and two optical amplifiers, one for even channels and one for odd channels.

In one embodiment, the bi-directional amplification node includes interleaver/deinterleaver 700, which includes a comb filter and a circulator and operates as described above with respect to FIG. 6. Interleaver/deinterleaver 710 similarly includes a comb filter and a circulator and operates as described above with respect to FIG. 6.

Optical amplifier 730 receives odd channels from interleaver/deinterleaver 700 and amplifies the signals that emit therefrom. Similarly, optical amplifier 720 receives even channels from interleaver/deinterleaver 710 and amplifies the signals that emit therefrom. The signals amplified by optical amplifier 730 are passed to interleaver/deinterleaver 710 and the signals amplified by optical amplifier 720 are passed to interleaver/deinterleaver 700.

In the foregoing specification, the invention has been described with reference to specific embodiments thereof. It will, however, be evident that various modifications and changes can be made thereto without departing from the broader spirit and scope of the invention. For example, filter 100 can be realized by using cube beam splitters (and other micro optics components) in free space instead of using fused fiber couplers. The specification and drawings are, accordingly, to be regarded in an illustrative rather than a restrictive sense.

What is claimed is:

1. An apparatus comprising:

first and second optical filters having a first input port to receive an optical signal and to provide a filtering function on the optical signal;

a first optical isolator optically coupled with a first output port of the first optical filter to route the filtered optical signal received from the first output port of the first optical filter to a second input port of the first optical filter such that the filtered optical signal is further filtered by the first optical filter and that the chromatic dispersion characteristics of the second pass through the first optical filter substantially cancel the chromatic dispersion characteristics of the first pass through the first optical filter, wherein the signal output from a second output port of the first optical filter comprises a first subset of optical signals from the optical signal; and a second optical isolator optically coupled with a first output port of the second optical filter to rout the filtered optical signal received from the first output port of the first optical filter to a second input port of the second optical filter such that the filtered optical signal is further filtered by the second optical filter and that the chromatic dispersion characteristics of the second pass through the second optical filter substantially cancel the chromatic dispersion characteristics of the first pass through the second optical filter, wherein the signal output from a second output port of the second optical signal comprises a second subset of optical signals from the optical signal.

2. The apparatus of claim 1 further comprising an optical splitter optically coupled to the first input port of the first optical filter and optically coupled to the first input port of the second optical filter, the optical splitter to split the optical signal and to send the optical signal to the first optical filter and to the second optical filter.

3. The apparatus of claim 1 wherein the first optical filter comprises first and second optical fibers fused in three positions, wherein one of the three fused portions have a coupling ratio of approximately 50—50 and the two other fused portions have a coupling ratio that is not 50—50, wherein a length of the first optical fiber between the first fused portion and the second fused portion is L, a length of the second optical fiber between the first fused portion and the second fused portion is L+$\Delta$L, a length of the second optical fiber between the second fused portion and the third fused portion is L and a length of the first optical fiber between second fused portion and the third fused portion is L+2$\Delta$L.

4. The apparatus of claim 1 wherein the second optical filter comprises first and second optical fibers fused in three positions, wherein one of the three fused portions have a coupling ratio of approximately 50—50 and the other two fused portions have a coupling ratio that is not 50—50, wherein a length of the first optical fiber between the first fused portion and the second fused portion is L, a length of the second optical fiber between the first fused portion and the second fused portion is L+$\Delta$L, a length of the second optical fiber between the second fused portion and the third fused portion is L and a length of the first optical fiber between second fused portion and the third fused portion is L+2$\Delta$L.

5. An apparatus comprising:

a first optical filter to receive a first set of signals with a first input port, the first optical filter to filter the first set of signals and to pass the first set of signals to a first output port;

a first optical isolator optically coupled with the first output port of the first optical filter, the first optical isolator to pass the filtered signal from the first output port to a second input port of the first optical filter such that the filtered optical signal is further filtered by the first optical filter and that the chromatic dispersion characteristics of the second pass through the first optical filter substantially cancel the chromatic dispersion characteristics of the first pass through the first optical filter;

a second optical filter to receive a second set of signals with a first input port, the second optical filter to filter the second set of signals and to pass the second set of signals to a first output port; and a second optical isolator optically coupled with the first output port of the second optical filter, the second optical isolator to pass the filtered signal from the first output port to a second input port of the second optical filter such that the filtered optical signal is further filtered by the second optical filter and that the chromatic dispersion characteristics of the second pass through the second optical filter substantially cancel the chromatic dispersion characteristics of the first pass through the second optical filter;

wherein the first optical filter further filters the signal received via the second input port and passes the further filtered signal to a second output port and the second optical filter further filters the signal received via the second input port and passes the further filtered signal to a second output port.

6. The apparatus of claim 5 further comprising a signal combining component optically coupled with the second output port of the first optical filter and with the second output port of the second optical filter to combine the signals output by the first optical filter and the second optical filter into a single signal comprising a superset of optical signals.

7. The apparatus of claim 6 wherein the signal combining component comprises a polarization beam splitter.

8. The apparatus of claim 5 wherein the first optical filter comprises first and second optical fibers fused in three positions, wherein one of the three fused portions have a coupling ratio of approximately 50—50 and the two other fused portions have a coupling ratio that is not 50—50, wherein a length of the first optical fiber between the first fused portion and the second fused portion is L, a length of the second optical fiber between the first fused portion and the second fused portion is L+ΔL, a length of the second optical fiber between the second fused portion and the third fused portion is L and a length of the first optical fiber between second fused portion and the third fused portion is L+2ΔL.

9. The apparatus of claim 5 wherein the second optical filter comprises first and second optical fibers fused in three positions, wherein one of the three fused portions have a coupling ratio of approximately 50—50 and the two other fused portions have a coupling ratio that is not 50—50, wherein a length of the first optical fiber between the first fused portion and the second fused portion is L, a length of the second optical fiber between the first fused portion and the second fused portion is L+ΔL, a length of the second optical fiber between the second fused portion and the third fused portion is L and a length of the first optical fiber between second fused portion and the third fused portion is L+2ΔL.

10. A method comprising:

receiving an optical signal having a first set of frequencies and a second set of frequencies;

directing the optical signal to a first optical filter and to a second optical filter;

directing the filtered optical signal from the first optical filter back through the first optical filter such that the filtered optical signal is further filtered by the first optical filter and that the chromatic dispersion characteristics of the second pass through the first optical filter substantially cancel the chromatic dispersion characteristics of the first pass through the first optical filter; and directing the filtered optical signal from the second optical filter back through the second optical filter such that the filtered optical signal is further filtered by the second optical filter and that the chromatic dispersion characteristics of the second pass through the second optical filter substantially cancel the chromatic dispersion characteristics of the first pass through the second optical filter.

11. The method of claim 10 wherein directing the optical signal to a first optical filter and to a second optical filter comprises passing the optical signal through beam splitting device.

12. The method of claim 11 wherein the beam splitting device comprises a polarization beam splitter.

13. The method of claim 10 wherein directing the filtered optical signal from the first optical filter back through the first optical filter comprises passing the filtered optical signal through an optical isolator optically coupled between an output port of an optical filter and an input port of the first optical filter.

14. The method of claim 10 wherein directing the filtered optical signal from the second optical filter back through the second optical filter comprises passing the filtered optical signal through an optical isolator optically coupled between an output port of an optical filter and an input port of the second optical filter.

15. The method of claim 10 wherein the first optical filter passes the first set of optical signal frequencies and the second optical filter passes the second set of optical signal frequencies.

16. A method comprising:

receiving a first optical signal having a first set of frequencies;

filtering the first optical signal with a first optical filter;

further filtering the filtered optical signals from first optical filter with the first optical filter such that the filtered optical signal is further filtered by the first optical filter and that the chromatic dispersion characteristics of the second pass through the first optical filter substantially cancel the chromatic dispersion characteristics of the first pass through the first optical filter;

receiving a second optical signal having a second set of frequencies;

filtering the second optical signal with a second optical filter;

further filtering the filtered optical signals from the second optical filter with the second optical filter such that the filtered optical signal is further filtered by the second optical filter and that the chromatic dispersion characteristics of the second pass through the second optical filter substantially cancel the chromatic dispersion characteristics of the first pass through the second optical filter;

combining the further filtered optical signals from the first optical filter and the second optical filter to create and optical signal having the first set of frequencies and the second set of frequencies.

17. The method of claim 16 wherein further filtering the filtered optical signals from first optical filter with the first optical filter comprises passing the filtered optical signal through an optical isolator optically coupled between an output port of the first optical filter and an input port of the first optical filter.

18. The method of claim 16 wherein further filtering the filtered optical signals from second optical filter with the second optical filter comprises passing the filtered optical signal through an optical isolator optically coupled between an output port of the second optical filter and an input port of the second optical filter.

19. The method of claim 16 wherein the first optical filter an the second optical filter comprise comb optical filters.

20. The method of claim 16 wherein the first optical filter passes the first set of optical signal frequencies and the second optical filter passes the second set of optical signal frequencies.

* * * * *

UNITED STATES PATENT AND TRADEMARK OFFICE
CERTIFICATE OF CORRECTION

PATENT NO.    : 6,636,661 B1
DATED         : October 21, 2003
INVENTOR(S)   : Zeng It is certified that error appears in the above-identified patent and that said Letters Patent is hereby corrected as shown below:

<u>Column 4,</u>
Line 14, after "blocks", delete "ilk".

Signed and Sealed this

Second Day of March, 2004

JON W. DUDAS
*Acting Director of the United States Patent and Trademark Office*